Feb. 16, 1937.　　　　J. H. GEISSE　　　2,070,588
ENGINE
Filed July 1, 1932　　　3 Sheets-Sheet 1
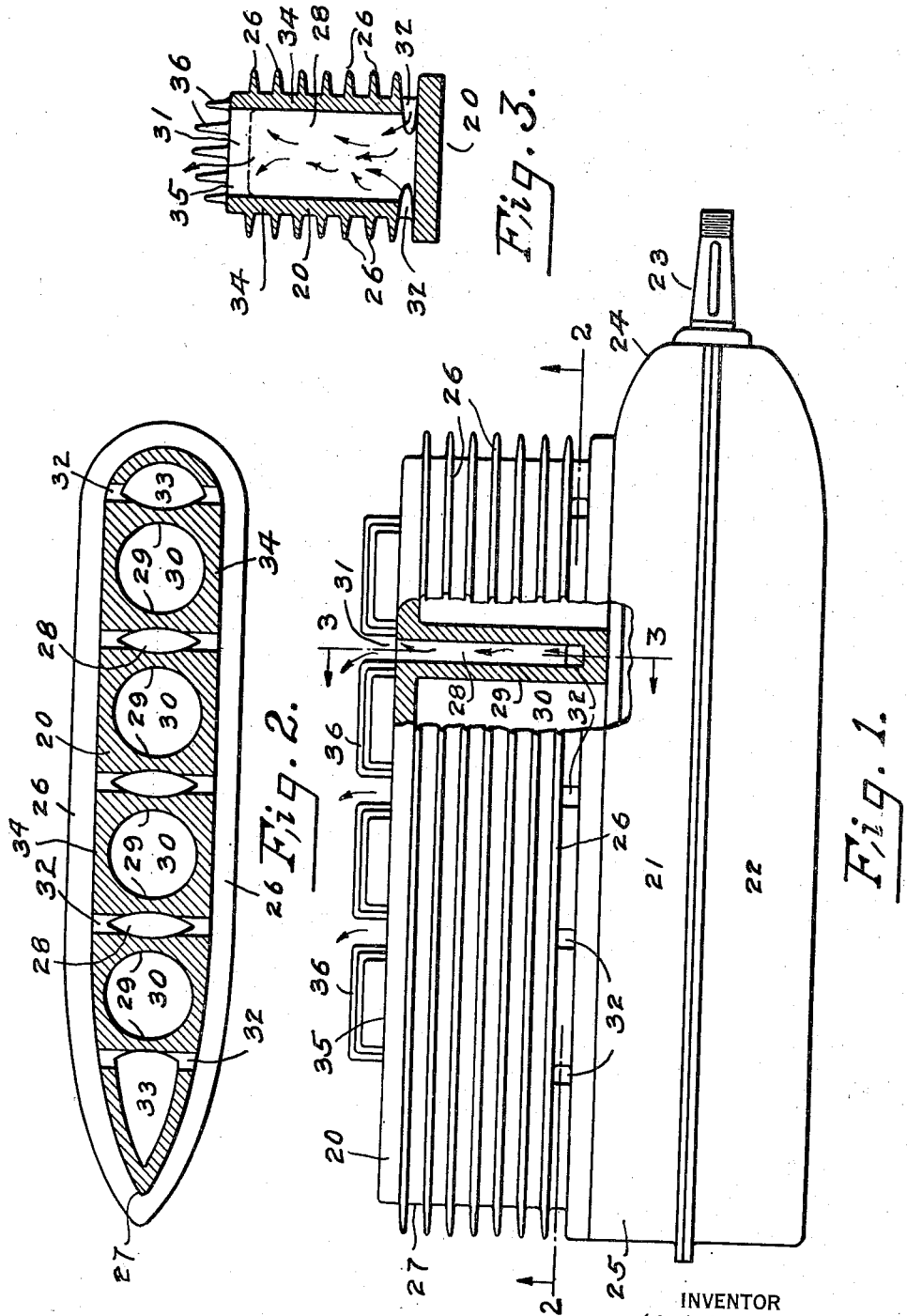
INVENTOR
JOHN H. GEISSE
BY
ATTORNEY Feb. 16, 1937.   J. H. GEISSE   2,070,588
ENGINE
Filed July 1, 1932   3 Sheets-Sheet 2
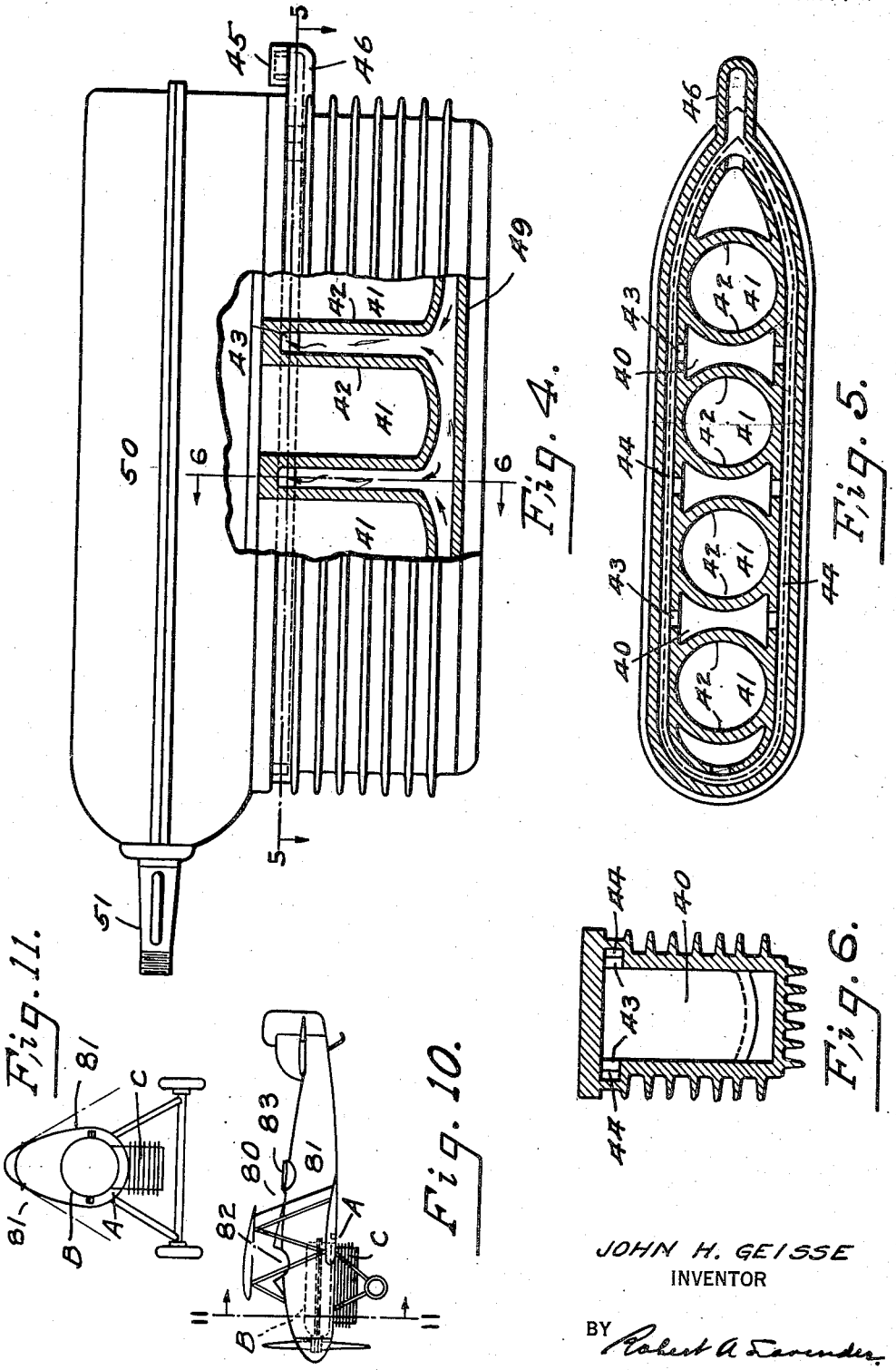
JOHN H. GEISSE
INVENTOR
BY Robert A. Lavender
ATTORNEY Feb. 16, 1937.                J. H. GEISSE                2,070,588
                                 ENGINE
                            Filed July 1, 1932          3 Sheets-Sheet 3

JOHN H. GEISSE
INVENTOR

BY
ATTORNEY

Patented Feb. 16, 1937

2,070,588

UNITED STATES PATENT OFFICE 2,070,588

ENGINE

John H. Geisse, Madison, Wis.

Application July 1, 1932, Serial No. 620,508

8 Claims. (Cl. 123—170)

(Granted under the act of March 3, 1883, as amended April 30, 1928; 370 O. G. 757)

My invention relates broadly to improvements in internal combustion engines, and more particularly to the refinement of a streamline design of an aircraft engine.

The principal object of my invention is to provide an internal combustion engine that is rugged, of light weight, and one that has a very small frontal area and a minimum of resistance when installed either as shown in in-line form or installed as of V form.

Another object of my invention is to provide an internal combustion engine with the cylinders arranged in line form and having streamlined cooling members constructed integrally with or directly attached to the engine cylinders, providing means of transmitting heat from those parts of the cylinders not forming part of the cooling elements to the cooling elements, thus obviating the necessity of deflecting the air stream to reach these inaccessible parts.

A further object of this invention is to provide an internal combustion engine of special streamline contour in plan view adapted to be installed in the nose of the fuselage of an airplane and give the maximum of vision range to the pilot of an airplane.

With the above and other objects in view, the invention consists in the construction, combination and arrangement of parts as will be described more fully hereinafter.

Reference is to be had to the accompanying drawings forming a part of the specification, in which like reference characters indicate corresponding parts throughout the several views, and in which:

Fig. 1 is a side view of a four-cylinder engine incorporating features of my invention;

Fig. 2 is a horizontal section on line 2—2 of Fig. 1;

Fig. 3 is a detail vertical section on line 3—3 of Fig. 1;

Fig. 4 is a side elevation of a slightly modified design of an engine having a plurality of cylinders in in-line form inverted to provide for improved visibility when installed in an airplane fuselage;

Fig. 5 is a horizontal section on line 5—5 of Fig. 4;

Fig. 6 is a detail vertical transverse section on line 6—6 of Fig. 4;

Fig. 10 is a detail side elevation of a portion of a typical airplane showing the location of a form of my engine installed in the nose of the fuselage in inverted position;

Fig. 11 is a fragmentary front view of the form shown in Fig. 10.

Figure 7:
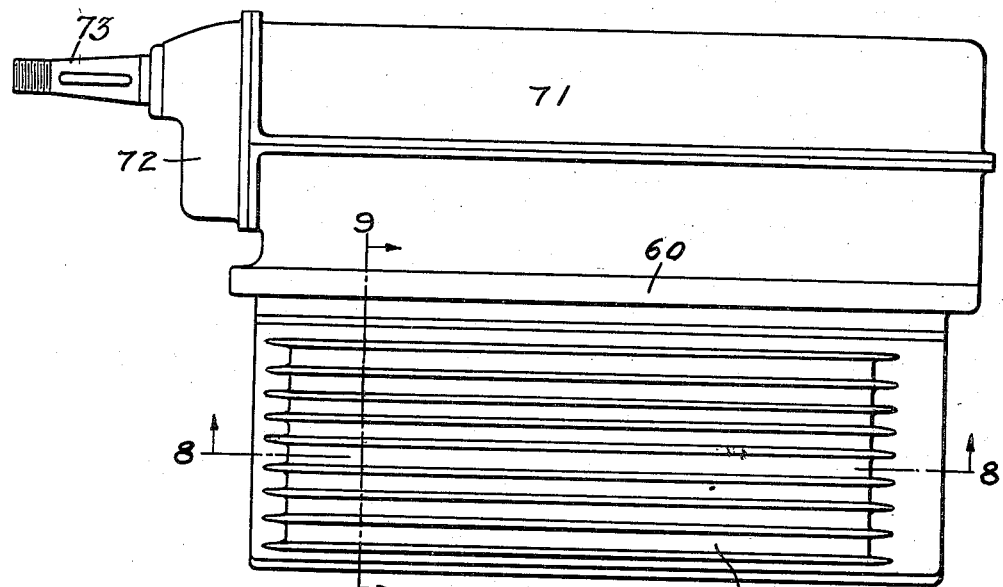
Fig. 7 is a detail side elevation of a further modification of my engine in which the cooling members are attached to the sides of the cylinder block.

Direct air cooling as applied to aviation engines has very distinct advantages over liquid cooling and has therefore become increasingly popular in recent years. An airplane installation provides a high velocity air stream which may be utilized for cooling purposes, in contrast to other engine installations which have no air stream other than that created for the exclusive purpose of cooling the engine. For this reason cooling systems which require a high velocity air stream, such as the direct air cooling system, are practical for aviation engines, but are generally impracticable for other types of engines because of the amount of power required to drive the cooling fan.

With direct air cooling, the radial form of engine has been found superior to other forms from the cooling standpoint, since in this form each cylinder is subject to the same air flow. The radial form, however, very materially interferes with the vision of the pilot when mounted on the nose of the fuselage, and it has the further disadvantages of poor balance, very high head resistance and a troublesome valve gear. Due to these disadvantages, there have been numerous attempts to develop direct air cooled aviation engines in the in-line and V forms. In both these forms the attainment of satisfactory cooling is a very difficult problem and has very seriously impeded their progress. The difficulty lies in properly deflecting the propeller slip stream to insure uniform cooling of all cylinders.

In all direct air cooled engines, regardless of their form, it is necessary to direct the air around each individual cylinder in quantities sufficient to secure proper cooling, and since the cylinders are truly cylindrical in form, this cannot be done without creating turbulent air flow at the rear of each cylinder. This turbulence does not provide any better cooling than can be obtained with pure streamline flow but it does very materially increase the resistance of the cylinder to passage through the air and hence the power required to overcome this resistance. Wind tunnel tests have shown that in the case of the radial engine, even with the best cowling so far developed, a very considerable percentage of the total engine power output is consumed in overcoming this resistance.

Liquid cooled engines have the advantage over direct air cooled engines in that their cooling element, the radiator, can be constructed in forms which do not produce turbulent air flow and therefore accomplish their function with the least expenditure of power. Liquid cooling also eliminates difficulties of cooling in the in-line and V forms and in these forms they are lighter than direct air cooled engines of like forms. However, the necessary use of a separate radiator adds to the weight of the power plant as a whole, and to its complication. Both the radiators and the radiator connections have been a source of trouble in the past, and this has caused a definite prejudice against liquid cooled engines for aircraft use.

Referring more particularly to Figs. 1, 2, and 3 of the drawings, 20 indicates the cylinder block of an internal combustion engine incorporating my improved features of streamline design and other novel cooling characteristics. The cylinder block 20 is attached in any well-known manner to the crank case which is shown in two parts 21 and 22 and preferably joined along the center line of the propeller shaft 23. The forward end 24 is rounded and the rear end 25 is tapered to conform to a streamline contour in plan of the cylinder block 20. The block 20 is provided with a series of cooling fins 26 extending around both sides and ends and tapering or converging to a point at the rear end as at 27. Air spaces 28 are located between the walls 29 of the cylinder bores 30 which are open at their upper ends 31, and are provided with openings 32 at their lower ends. Air spaces 33 are substantially the same as the spaces 28 except that they are of greater area. The spaces 28 and 33 are so formed in cross section (see Fig. 2) that the walls 29 are thinnest along the center line of the cylinder block and gradually increase in area toward the outer walls 34. This enlargement of the cylinder walls is for the purpose of providing gradually increasing thermal path for the flow of the heat from the relatively uncooled portions of the cylinders to the cooling fins. The cylinder heads 35 are also provided with heat radiating fins 36 to conform to the ones 26 along the sides of the block 20.

It will be seen by referring to Fig. 3 that the air will be permitted to enter the openings 32, pass up between the cylinder walls 29 and out at the top of the spaces 28, as shown by arrows, although this provision may not be necessary.

Reference to Figs. 4 to 6 inclusive will disclose a slightly modified form of my streamlined design of cooling features in which I propose to assist in the control of the engine temperature by introducing a coolant fluid having a high boiling point, such as ethylene glycol, into the jacket space 40 between the cylinder walls 42 of the bores 41, the circulating duct 44 and the communicating ducts 43. A cap 45 is threaded upon the neck 46 of the supply extension 47 of the cylinder block 49.

This construction has the advantage of tightness due to the reduction in liquid required by having the outside wall common with the outer cylinder walls. It also provides a rigid block construction by tying the cylinders together with the jacket wall while still permitting expansion of the individual cylinders.

The crank case 50 and the propeller shaft 51 are practically the same as shown in Figs. 1 to 3 inclusive, except that it is inverted.

Figure 8:
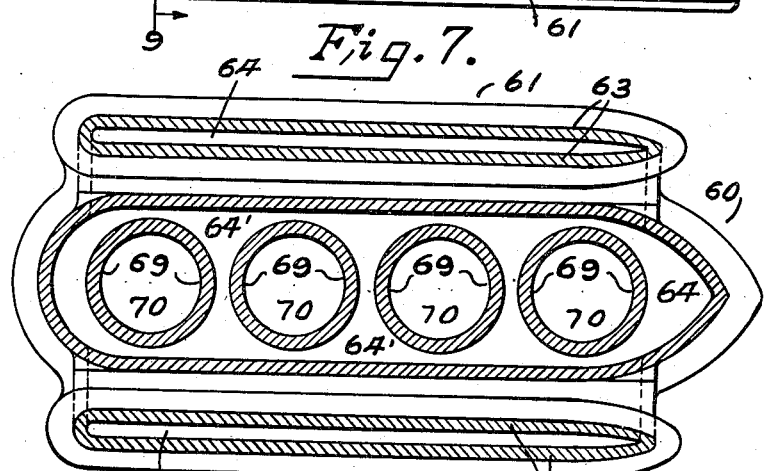
Fig. 8 is a horizontal section on line 8—8 of Fig. 7.
Figure 9:
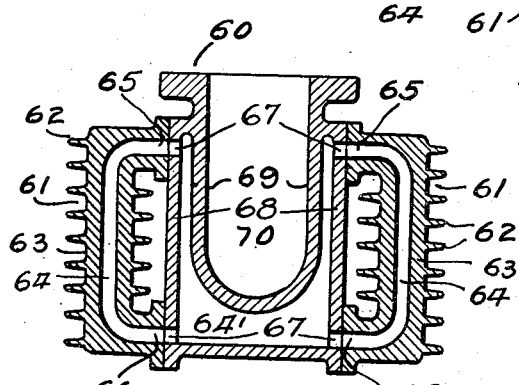
Fig. 9 is a vertical section on line 9—9 of Fig. 7.

Referring to Figs. 7 to 9 inclusive, I have shown a further modification of an inverted internal combustion engine of the in-line form of cylinder arrangement having a streamline contour in plan, a cylinder block 60, and being provided with streamline radiator members 61 directly attached at each side of the block 60. The radiator members 61 are of streamline contour in plan and are provided with fins 62 entirely surrounding the side walls 63 of the coolant passages 64. Communicating openings 65 and 66 are located at the upper and lower ends of the radiator members 61 which register with openings 67 in the side walls 68 of the cylinder block 60. The coolant fluid will circulate around the cylinder walls 69 of the cylinder bores 70 and through the openings 65 and 66, and the passage 64. This arrangement will adapt its use to the thermo siphon circulation of the coolant fluid and permit the use of a coolant medium having a lower boiling point than would be required in my other modification. In this form, it will be noted that the coolant passages 64 entirely surround the cylinder walls 69 and extend over the closed end of the cylinder bore 70.

Provision is made in the crank case 71 for a gear housing 72 designed to allow the use of reduction speed ratio gears and for the offset of the propeller shaft 73.

In Figs. 10 and 11, I have shown more or less diagrammatically a typical assembly for either of my inverted engine modifications installed in an airplane 80. The fuselage 81 is provided with an inverted form of engine A, having the crank case B, enclosed within the lines of the fuselage 81, and the cylinder block C attached to the crank case and projecting below the bottom of the fuselage 81 so that the air flow generated by the slipstream of the airplane in motion will come in direct contact with the cooling members for reducing the running temperature of the engine. By the installation of either form of my streamlined inverted engine, the visibility of the pilot may be improved. The pilot's cockpit 82 is located directly over the engine crank case B and the gunner's cockpit 83 may be placed to an advantage towards the tail of the airplane and will also benefit by the improved range of visibility from that cockpit. The location of the pilot and engine forward will thus allow the balance of the airplane by placing the gunner well to the rear.

It will be understood that the above description and accompanying drawings comprehend only the general and preferred embodiment of my invention, and that various changes in construction, proportion and arrangement of parts may be made within the scope of the appended claims without sacrificing any of the advantages of this invention.

The invention described herein may be manufactured and used by or for the Government of the United States of America for governmental purposes without the payment of any royalties thereon or therefor.

What I claim is:

1. In an internal combustion engine, in combination, a crank case, a cylinder block attached to said crank case, a continuous outer wall on said cylinder block forming a portion of the cylinders themselves, cooling fins on said outer wall, cooling chambers between the cylinders bounded by the cylinder walls and said outer wall, cooling chambers surrounding the heads and communicating with said cooling chambers between the cylinders of said block, other chambers provided with communicating passages between said cooling chambers between the cylinders, said other chambers being located at the crank case end of said cylinders.

2. In a cylinder block for internal combustion engines, a plurality of cylinders cast en-block and in-line sequence, a plurality of coolant spaces fore and aft of each cylinder, said block having a wall of streamline contour in plan forming a portion of the walls of the cylinders and coolant spaces, a cover wall secured to the streamline wall, secondary coolant spaces between said cover wall and the inclosed ends of the cylinders, said secondary spaces in communication with the first mentioned coolant spaces, cooling fins on the streamline wall and cover wall, a duct in the streamline wall, passages between the duct and the first mentioned cooling spaces, said passages, duct and spaces adapted to receive a coolant fluid for radiating heat from the engine.

3. In an internal combustion engine, in combination, a crank case, a cylinder block attached to said crank case, said block comprising a bank of cylinders and a continuous wall of streamline contour forming an integral part of each of the cylinders of the cylinder block, said continuous wall and cylinder walls forming interconnected spaces adapted to receive a cooling liquid.

4. In an internal combustion engine, a cylinder block comprising a series of cylinders and a continuous wall forming an integral part of the walls of each of said cylinders, and forming therewith interconnected spaces adapted to receive a cooling liquid.

5. In a cylinder bank for an internal combustion engine, a plurality of cylinders integrally cast en-block and in-line sequence, a continuous wall forming an integral part of the wall of the cylinders, thereby producing an unbroken exterior contour for said plurality of cylinders, cooling fins on the exterior surface of said surrounding wall, and interconnected spaces for cooling the transverse walls of each respective cylinder with a cooling liquid.

6. In an internal combustion engine, a bank of cylinders, a continuous wall of streamline contour forming an integral part of the walls of each of said cylinders, coolant spaces bounded by the walls of the cylinders and said continuous wall, cooling fins on said continuous wall, a cover wall secured to the continuous wall, secondary coolant spaces between said cover wall and the inclosed ends of the cylinders, said secondary coolant spaces being connected with and forming a part of said first mentioned coolant spaces.

7. In an internal combustion engine, in combination, a crank case, a cylinder block attached to said crank case, a continuous wall of streamline contour forming a portion of the cylinders, heads for each of said cylinders, cooling fins on said streamline wall and said heads, and interconnected passages for cooling the interior of said cylinder block with a cooling liquid.

8. In an internal combustion engine, in combination, a crank case, a cylinder block having a plurality of cylinders therein attached to said crank case, a continuous wall forming an integral part of the wall of each of said cylinders, cooling fins on said wall, cooling spaces fore-and-aft of each of said cylinders, and interconnecting passages between said cooling spaces, said cooling spaces adapted to receive a cooling liquid.

JOHN H. GEISSE.